United States Patent [19]

Lutz

[11] Patent Number: 4,886,480
[45] Date of Patent: Dec. 12, 1989

[54] PRELOADED DRIVE ASSEMBLY

[75] Inventor: Christian Lutz, Nüziders, Austria

[73] Assignee: Etablissement Supervis, Vaduz, Austria

[21] Appl. No.: 183,723

[22] Filed: Apr. 20, 1988

[30] Foreign Application Priority Data

Feb. 12, 1988 [AT] Austria .................................. 324/88

[51] Int. Cl.$^4$ .............................................. F16D 3/16
[52] U.S. Cl. ..................................... 464/112; 464/147
[58] Field of Search .................. 464/51, 106, 112, 147

[56] References Cited

U.S. PATENT DOCUMENTS

| | | | |
|---|---|---|---|
| 1,243,347 | 10/1917 | Schwinn | 464/106 |
| 2,104,101 | 1/1938 | Rosenbaum | 464/112 |
| 2,615,315 | 10/1952 | Werner | 464/51 |
| 3,431,751 | 3/1969 | Stokely | 464/106 X |
| 4,135,372 | 1/1979 | Benson | 464/112 X |
| 4,498,888 | 2/1985 | Pastor | 464/112 |
| 4,560,368 | 12/1985 | Sherman, II et al. | 464/112 |
| 4,579,546 | 4/1986 | Pastor | 464/112 |

FOREIGN PATENT DOCUMENTS 467917 6/1937 United Kingdom ................ 464/112

Primary Examiner—Daniel P. Stodola
Attorney, Agent, or Firm—Toren, McGeady & Associates

[57] ABSTRACT

A joint for transmitting torque is made up of an outer generally tulip-shaped coupling member, an inner coupling member and an intermediate member received within the outer coupling member and, in turn, receiving a joint pin of the inner coupling member. The intermediate member is formed by two generally symmetrical shell halves, each having a surface contacting the other with the contacting surfaces forming a separation plane. The axis of the joint pin is located in, or closely adjacent to, the separation plane. A shaped spring fits through the two shell halves and into recesses in the opposite ends of the joint pins. Axially aligned pivot pins interconnect the outer coupling member and intermediate member and are located on opposite sides of the joint pin axis. The axes of the pivot pins intersect the joint pin axis at right angles.

12 Claims, 3 Drawing Sheets

U.S. Patent  Dec. 12, 1989  Sheet 1 of 3  4,886,480

PRELOADED DRIVE ASSEMBLY

BACKGROUND OF THE INVENTION

The present invention is directed to a joint for torque transmission where the joint is made up of an outer generally tulip-shaped coupling member, an inner coupling member and an intermediate member positioned within the outer coupling member and in turn receiving a joint pin of the inner coupling member. The outer coupling member and the intermediate member are pivotally connected by pivot pins. The joint pin on the inner coupling member is pivotally displaceable within the intermediate member. The pivot pins extend perpendicularly of the axis of the joint pin. The contacting surfaces of the outer coupling member and the intermediate member through which the pivot pins extend are flat.

Such joints as described above are used in steering columns for motor vehicles and, in particular, in connection with the steering wheel. The steering wheel can be tilted by using such a joint located between the steering wheel and the steering column. The tilting action of the steering wheel facilitates getting into and out of the vehicle. When the vehicle is being driven, the motion of the steering wheel is transmitted by the joint through the steering gear and steering linkage. Such a joint cannot have excessive tolerances or too great a play to assure satisfactory steering operation, that is, in the transmission of torque, otherwise several support points in such a joint would be unavoidable where the joint requires a certain minimum play to assure that the joint is "easily" movable. Moreover, if an essential part of the joint is made of a plastics material, then considerable dimensional changes as a result of heat can be expected, since such plastics materials have a relatively large heat expansion coefficient. Moreover, during operation, temperature differences of 20° C. are to be expected.

SUMMARY OF THE INVENTION

Therefore, based on the known state of the art, the primary object of the present invention is to provide a joint using easily slidable plastics materials with a low coefficient of friction so that preloading forces are effective within the joint to compensate for tolerances present in the joint, independent of whether the tolerances are caused in the fabrication of the joint or because of the materials used.

In accordance with the present invention, the intermediate member is formed of a plastics material and is made up of two generally symmetrical shell halves with a separation plane located between the shell halves. The joint pin of the inner coupling member extends in the separation plane of the shell halves.

Further, a spring secures the shell halves together and presses against the opposite ends of the joint pin of the inner coupling member.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
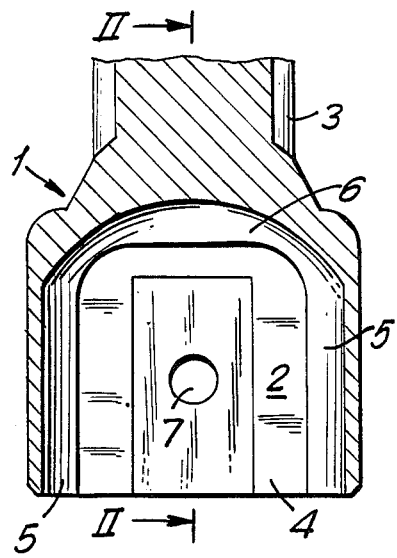
FIG. 1 is a cross-sectional view of a tulip-shaped first coupling member taken along the line I—I in FIG. 2.
Figure 2:
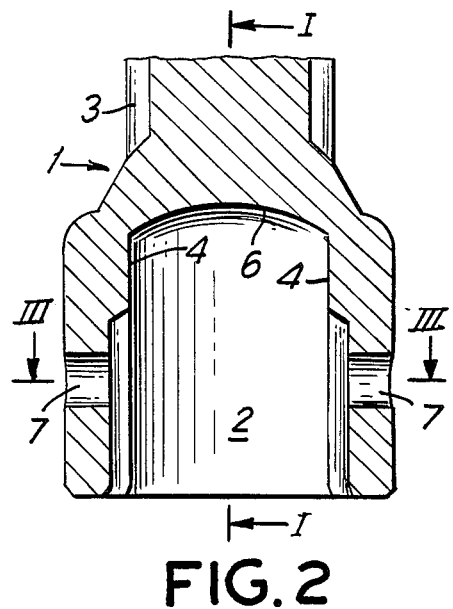
FIG. 2 is a cross-sectional view of the first coupling member taken along the line II—II in FIG. 1.
Figure 4:
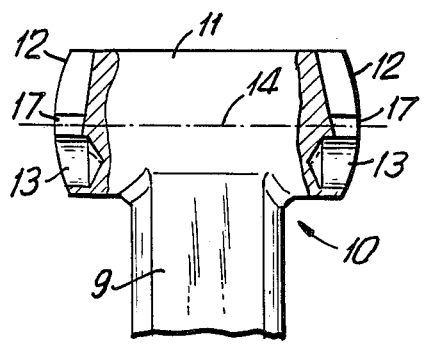
FIG. 4 is a partial elevational view, partly in section, of a second coupling member.
Figure 3:
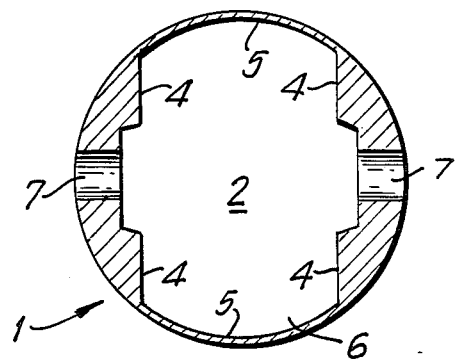
FIG. 3 is a cross-sectional view of the first coupling member taken along the line III—III in FIG. 2.
Figure 14:
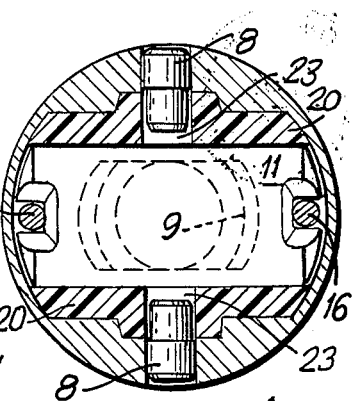
FIG. 14 is a cross-sectional view taken along the line XIV—XIV in FIG. 12.
Figure 12:
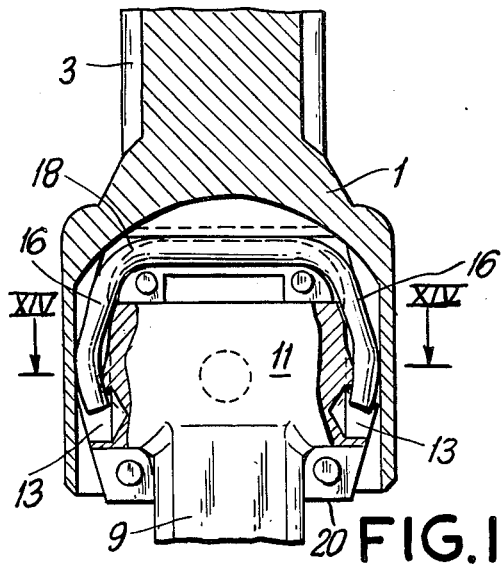
FIG. 12 is an assembled view of the joint embodying the present invention made up of the first coupling member, the intermediate member and the second coupling member.
Figure 13:
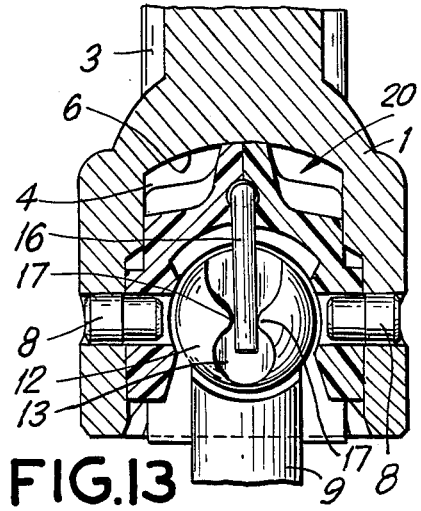
FIG. 13 is a cross-sectional view of the joint shown in FIG. 12, taken at 90° to the section in FIG. 12.
Figure 16:
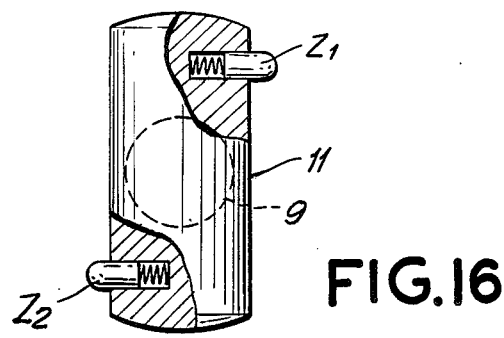
FIGS. 16–18 illustrate a second variation utilizing a spring and pressure piece arranged in the joint pin.
Figure 17:
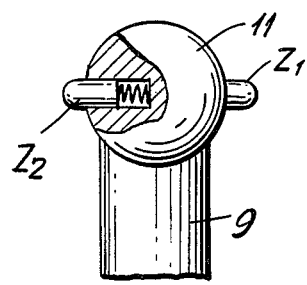
Figure 18:
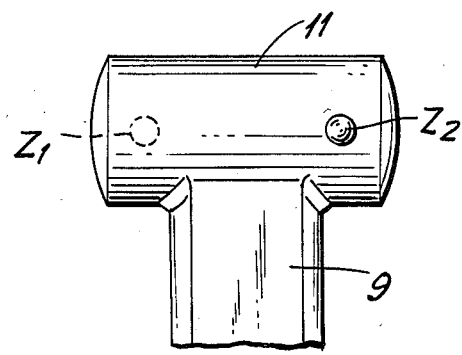

In FIGS. 12, 13 and 14, an assembled joint for torque transmission is illustrated with the members making up the joint illustrated in condition ready for operation. FIGS. 1, 2 and 3 show the generally tulip-shaped first or outer coupling member 1. The first coupling member 1 defines a recess or cavity 2 and includes an integral axially extending shank 3, though only a part of the shank is illustrated. As can be seen in FIG. 3, the cavity 2 is bounded on two diametrically opposite sides by flat surfaces 4 disposed parallel to one another and by circular cylindrical surfaces 5, extending transversely of the flat surfaces 4. The base of the cavity, or the upper surfaces viewed in FIGS. 1 and 2, is formed by a spherical surface 6. Aligned bores 7 are located in the flat surfaces 4 of the first coupling member 1, and these bores are intended to receive pivot pins 8, note FIGS. 13 and 14. Second or inner coupling member 10, note FIGS. 4 and 5, has an axially extending shank 9, only a portion of which is illustrated, with a cylindrical joint pin 11 having a central axis 14 located at one end of the shank 9. The pivotally movable joint pin 11 is formed integrally with the shank 9. Joint pin 11 has end faces 12 extending transversely of its axis 14 and each end face has a recessed surface 13 with the recessed surface having the shape of a FIG. 8 open at the top, note FIG. 5. The depth of the recessed surfaces 13 inwardly of the end surfaces 12 in the direction of the axis 14 is at least equal to the thickness s of the U-shaped torsion spring 15, note FIGS. 6 and 7. The first coupling member 1 has a diameter approximately 2½ times greater than the diameter of the joint pin 11.

Figure 5:
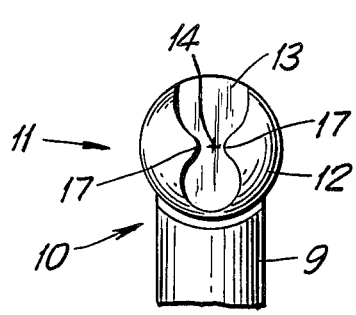
FIG. 5 is an elevational view of the second coupling member in FIG. 4, with the second coupling member turned through 90°.

In each recessed surface 13, the side surfaces starting at the top, as viewed in FIG. 5, first converge inwardly and then outwardly. At the transition point, between the inwardly and outwardly converging surfaces, a pair of oppositely located contact surfaces 17 are located for contacting one of the legs 16 of the torsion spring 15. Contact surfaces 17 are essentially parallel to the vertical plane containing the axis 14 of the joint pin 11. The plane also contains the axis of the shank 9. Contact surfaces 17 are slightly rounded. The lower part of the recessed surfaces 13 located below the contact surfaces 17 as viewed in FIG. 5 have a increased dimension inwardly from the end faces 12 as compared to the upper part of the recessed surface, note FIG. 4.

Figure 6:
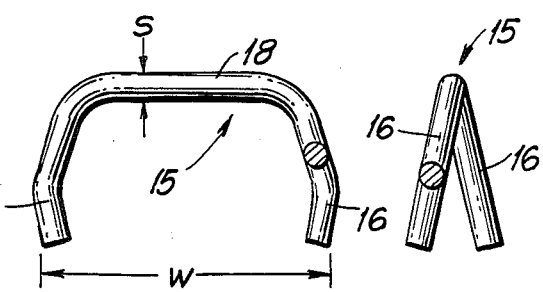
FIG. 6 is an elevational view of a U-shaped torsion spring.
Figure 7:
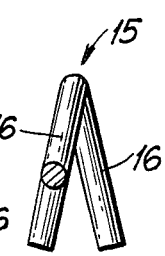
FIG. 7 is an elevational view of the spring shown in FIG. 6 turned through 90°.

As mentioned above, torsion spring 15 is shown in FIG. 6 in a front view and in FIG. 7 in a side view. The spring 15 is U-shaped. The spring has two legs 16 extending outwardly from a bight section 18. As can be seen in FIG. 7, the legs 16 are offset relative to one another so that in side view they provide a V-shaped appearance. The spring is formed of a round steel wire with the legs 16 integral with the bight part 18.

Figure 8:
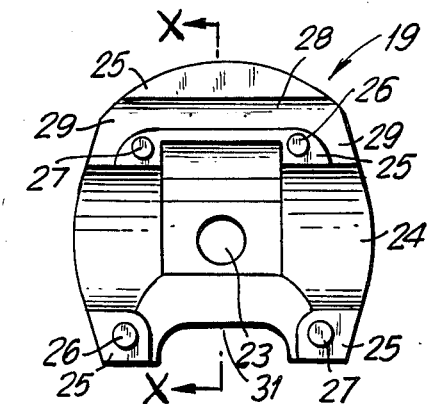
FIG. 8 is an elevational view of the inside of a shell half forming part of an intermediate member.
Figure 10:
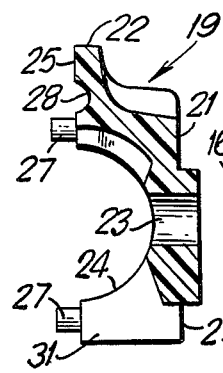
FIG. 10 is a sectional view of the shell half taken along the line X—X in FIG. 8.
Figure 9:
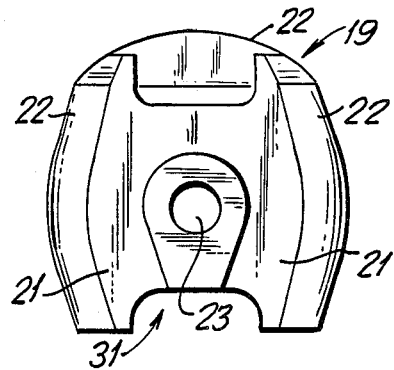
FIG. 9 is an elevational view of the outer side of the shell half illustrated in FIG. 8.
Figure 11:
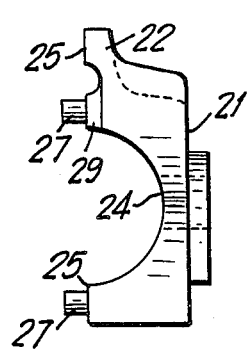
FIG. 11 is an elevational view of the shell half shown in FIG. 9 turned through 90°.

Intermediate member 20 is located between the first and second coupling members 1, 10 and receives the joint pin 11. The pivot pins 8 interconnect the first coupling member and the intermediate member. The intermediate member is formed of a suitable plastics material which has good sliding and frictional properties in contact with steel. Accordingly, it has a low coefficient of friction and also has special resistance to seizure properties. Intermediate member 20 is formed by two identical symmetrical shell halves 19. In FIG. 8, the inside of a shell half 19 is displayed while in FIG. 9, the outside is shown, FIG. 10 is a cross-sectional view of the shell half in FIG. 8, while FIG. 11 is a side view. As seen best in FIGS. 10 and 11, the outer side of each shell half 19 is formed by a flat or planar surfaces 21 and by spherical surfaces 22. The spherical surfaces 22, as shown in FIGS. 12 and 13, bear against the spherical surface 6 in the recess 2 of the first coupling member 1. In the assemblied condition, shank 9 of the second coupling member 10 extends through the opening in the first coupling member 1. Axially aligned bores 23 are formed in each shell half for receiving the pivot pins 8. In the assembled condition, the shell halves 19 form a generally cylindrically shaped recess 24 in which the joint pin 11 seats. The facing surfaces of the shell halves have centering bores 26 or centering pins 27 in a staggered arrangement, note FIG. 8. The pins 27 project across a separation plane 25 formed by the facing surfaces into a centering bore in the opposite shell half. Accordingly, the interengagement of the pins 27 in the centering bores 26 provide a positive locking engagement of the shell halves 19 in the assembled condition. Above the central recess 24 into which the joint pin 11 seats, a groove-like depression 28 is located in each shell half 19 opening to the separation plane 25 so that the depression runs generally parallel to the axis of the joint pin 11. At the opposite ends of the depression 28, end surfaces 29 curve downwardly and terminate at the arch of the central recess 24.

While FIGS. 1–11 show the individual parts of the joint embodying the present invention, FIGS. 12, 13 and 14 show the joint assembled and ready to operate with the joint being shown in two axially extending sections and one transverse section corresponding generally to the illustrations in FIGS. 1, 2 and 3. In the assembled condition, it can be seen that the joint pin 11 located at the end of the shank 9 is received in the cylindrically shaped central recess 24 formed by the shell halves 19 making up the intermediate member 20. The torsion spring 15 has its bight part 18 located in the depressions 28 formed by the assembled shell halves 19 with the legs 16, note FIGS. 12 and 13, extending downward into the recessed surfaces 13 at the ends 12 of the joint pin 11. The width w of the spring 15, as shown in FIG. 6, is dimensioned so that at no point along the spring between the opposite free ends of its legs does it project outwardly beyond the outside surface of the shell halves or the intermediate member 20, note FIGS. 12–14. The two shell halves 19 making up the intermediate part 20 interengage by means of the centering bores 26 and the centering pins 27 in a positive locking manner and the shell halves are secured together by the flat surfaces 4 of the outer or first coupling member 1, note FIGS. 13 and 14, with the position of the shell halveswithin the cavity 2 of the first coupling member 1 secured by the outer pivot pins 8 inserted into the bores 7, 23.

Figure 15:
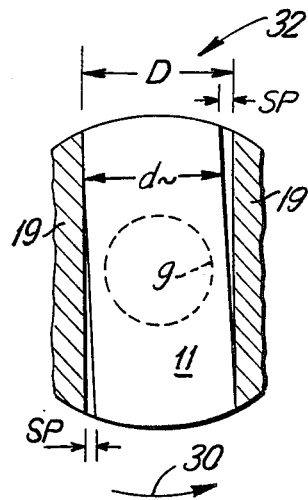
FIG. 15 is a diagramatic showing of the functional principle of the present invention.

The staggered arrangement of the legs 16 of the torsion spring 15 with the bight portion 18 clamped into the depression 28 of the intermediate member 20 causes the joint pin 11 in the central recess 24 of the intermediate part to be inclined by the amount of the differential dimension extending between these parts. The differential dimension is in itself quite small and cannot be easily discerned from the drawing. FIG. 15 is provided to illustrate the differential dimension and corresponds to a sectional illustration of FIG. 14, however, the dimensions of the parts of the joint are not to scale to provide a better illustration of the arrangement. As shown in FIG. 15, the diameter D of the central recess 24, in which the joint pin 11 is seated and formed by the shell halves 19, is larger than the corresponding diameter d of the joint pin 11. The staggered legs of the U-shaped torsion spring cause the joint pin 11 to be inclined in the central recess 24 in a plane disposed perpendicularly to the shank 9 shown dotted in FIG. 15, independently of the respective angular position of the intermediate member 20 relative to the shank 9. In actual operation, if the inner or second coupling member 10 is rotated within the joint in the direction of the arrow 30, then a tolerance or play-free transmission force exists between the shell halves 19 and the joint pin 11, due to the action of the spring 15, with the joint pin 11 bearing against the surface of the central recess 24 in the rotational direction indicated by the arrow 30, note FIG. 15. If the direction of rotation is reversed, that is, in the direction of the arrow 32 in FIG. 15, then the play SP must be overcome against the action of the torsion spring 15 until the force transmitting surfaces are in contact with one another. The torsion spring 15, that is, its stiffness, is selected so that the compensation for play counter to the action of the spring is not noticeable by a person operating the joint in transmitting torque.

In the embodiment just described, a U-shaped torsion spring 15 is used, however, it would be possible to compensate for the play existing in the joint by a different type of spring force. For instance, a blind bore could be provided in the central region of the joint pin 11 into which a spring is inserted along with a pressure piece ($Z_1$, $Z_2$) acting outwardly, with the axis of the blind bore arranged in a plane passing through the axis 14 of the joint pin and arranged at right angles to the axis of the shank 9. In such an arrangement, the play is overcome against the spring force in each direction of rotation. It is also possible, however, to locate the blind bores as well as the springs and pressure pieces in the end regions of the joint pin and in the same plane as mentioned above. These bores located at the opposite end faces 12 of the joint pin 11 are offset relative to one another so that their action provides the position shown schematically in FIG. 15. This last arrangement, however, is less advantageous than the embodiment illustrated and described above, because the pressure pieces contact the support surfaces within the central recess 24 of the intermediate member 20 and the pressure parts must be moved relative to the wall.

In accordance with the present invention, the play between the parts of the joint described above and due to the materials involved, is completely compensated in one direction of rotation so that the force transmitting surfaces are always in contact with one another. In the other rotation direction, however, the existing play SP, note FIG. 15, must be overcome against the action of the spring 15 and the spring force must be selected in such a way that compensation for such play is not noticed by the user of the joint.

Plastics material is preferred for the shell halves 19 forming the intermediate member 20, particularly plastics material with favorable sliding and frictional properties. The present invention, however, does not exclude the possibility of forming the shell halves from metal.

The pivot pins 8 as can be noted from the drawing, can have a very small diameter compared to the joint pin 11, since the only task of the pivot pins is to assure the interconnection of the members forming the joint. The forces developed by the transmission of the torque by the joint embodying the present invention do not stress the pivot pins 8 due to the arrangement of the joint. At the same time, the joint of the present invention permits the inner joint pin 11 to have a relatively large diameter, since the inner joint pin is highly loaded during the use of the joint.

In U.S. Pat. No. 4,135,372, a universal joint is disclosed serving for the transmission of torque and providing compensation for torsional play. The joint in this patent is formed of two shell halves. The shell halves, however, do not lie in direct contact with one another at their plane of separation, rather they include a so-called clamping gap dimensioned to compensate for wear due to the material used. Wave washer springs bear against the shells of the intermediate member and are penetrated by pins which abut the inner side of a fork-like coupling member. The wave washers secure the pivot pin in axial position. The spring characteristic of the wave washer is considerably impaired by the preloading involved in the joint, so that no well defined conditions exist in the joint. Moreover, a wafer or washer is located between the shell halves of the intermediate member and the wave washers to prevent the washers from cutting into the material of the shell halves. Furthermore, in the universal joint of the patent, it is hardly possible to automate the assembly of the individual members, since during assembly of the universal joint, the wafers, as well as the wave washers, must be positioned relative to the pivot pins and this cannot be achieved economically. Accordingly, it is impossible to automate the assembly of this joint at an economically acceptable cost.

While specific embodiments of the invention have been shown and described in detail to illustrate the application of the inventive principles, it will be understood that the invention may be embodied otherwise without departing from such principles.

I claim:

1. A joint for transmitting torque comprising a generally tulip-shaped first coupling member having a first recess therein with an opening into the first recess, and intermediate member pivotally mounted within the first recess in said first coupling part, a second coupling member pivotally mounted within a second recess located within said intermediate member, first means for connecting said first coupling part with said intermediate member, second means for connecting said second coupling member and said intermediate member, said second coupling member comprises an axially elongated shank and a joint pin at one end of said shank having an elongated axial dimension extending transversely of the axis of said shank and located within the second recess in said intermediate member, said joint pin having a uniform diameter, said first connecting means comprises axially extending pivot pins disposed in axial alignment on opposite sides of the axis of said joint pin and pivotally interconnecting said first coupling member and said intermediate member, the axes of said pivot pins intersect at right angles with the axis of said joint pin, said first coupling member and said intermediate member having flat surfaces in the region where said pivot pins interconnect said first coupling member and said intermediate member includes generally symmetrical shell halves having facing contacting surfaces forming a separation plane of said shell halves with said axis of said joint pin located at least one of within and immediately adjacent to said separation separation plane is located at right angles to the aligned axes of said pivot pins, and said second connecting means includes a spring member in engagement with said irate member and opposite ends of said joint pin extending transversely of the axis thereof for interconnecting said intermediate part and said second coupling member and for applying a play compensating spring force to said joint pin.

2. A joint, as set forth in claim 1, wherein said shell halves are formed of a plastics material.

3. A joint, as set forth in claims 1 or 2, wherein a groove-like depression is located in a separation plane surface of each of said shell halves with the depressions extending generally parallel to the axis of said joint pin and located on an opposite side of said intermediate member from an opening in said intermediate member into said second recess, and said spring member comprises a U-shaped torsion spring having an elongated bight part and a leg extending outwardly from each end of said bight part, and said legs disposed in recessed surfaces at opposite ends of said joint pin extending transversely of the axis of said joint pin.

4. A joint, as set forth in claim 3, wherein the legs of said spring are angularly offset with respect to one another relative to the opposite ends of said bight part so that said legs transverse to the axis of said joint pin have a V-shape appearance extending outwardly from said bight part.

5. A joint, as set forth in claim 3, wherein the legs of said U-shaped torsion spring have a uniform diameter and the depth of said recessed surfaces in the ends of said joint pin are at least as great as the diameter of said legs of said spring.

6. A joint, as set forth in claim 5, wherein said recessed surfaces include arcuately curved surfaces extending inwardly from said ends of said joint pin and said arcuately curved surfaces including contact surfaces for contacting the legs of said spring with said surfaces arranged in pairs in the region of and on opposite sides of the axis of said joint pin and being generally parallel to a plane including the axis of said joint pin and the axis of said shank of said second coupling member.

7. A joint, as set forth in claim 6, wherein said contact surfaces for contacting said legs of said torsion spring in said recessed surfaces in the end faces of said joint pin are convexly rounded.

8. A joint, as set forth in claim 1, wherein in the plane of separation, said shall halves each have centering pins extending outwardly from the plane of separation and centering bores extending inwardly from the plane of separation and said centering pins on said shell halves extend into the centering bores on said shell halves for effecting a positively locked engagement of said shell halves forming said intermediate member.

9. A joint, as set forth in claim 1, wherein at least one bore is provided in said joint pin with the bore having an axis extending generally perpendicularly to a plane containing the axis of said joint pin and the axis of said shank of said second coupling member, and said spring member comprises a spring and a pressure member located within said bore with said spring pressing said pressure member outwardly.

10. A joint, as set forth in claim 9, wherein one said bore is provided in each of the end faces of said joint pin with said bores each located on an opposite side of the plate containing the axis of said joint pin and the axis of said shank of said second coupling member.

11. A joint, as set forth in claim 1, wherein said first coupling member has a diameter approximately $2\frac{1}{2}$ times greater than the diameter of said joint pin.

12. A joint, as set forth in claim 1, wherein said pivot pins interconnecting said first coupling member and said intermediate member each have a diameter forming a fraction of the diameter of said joint pin.

* * * * *